US005791790A

United States Patent [19]

Bender et al.

[11] Patent Number: 5,791,790
[45] Date of Patent: Aug. 11, 1998

[54] METHOD AND APPARATUS FOR PROVIDING PRINT JOB BUFFERING FOR A PRINTER ON A FAST DATA PATH

[75] Inventors: Michael Donald Bender; John Knox Brown, III; Matthew Scott Keith; Martin Geoffrey Rivers; Christopher Mark Songer; Gail Marie Songer, all of Lexington, Ky.

[73] Assignee: Lexmark International, Inc., Lexington, Ky.

[21] Appl. No.: 615,756

[22] Filed: Mar. 13, 1996

[51] Int. Cl.$^6$ .................................................. G06F 12/00
[52] U.S. Cl. ........................................... 400/61; 395/115
[58] Field of Search ..................... 400/61, 76; 395/114, 395/115, 116

[56] References Cited

U.S. PATENT DOCUMENTS

| | | | |
|---|---|---|---|
| 4,279,523 | 7/1981 | Ringle | 400/279 |
| 4,323,987 | 4/1982 | Holtz et al. | 365/229 |
| 4,458,307 | 7/1984 | McAnlis et al. | 364/200 |
| 4,493,049 | 1/1985 | Donohue et al. | 364/900 |
| 4,586,147 | 4/1986 | Tadokoro | 364/550 |
| 4,589,090 | 5/1986 | Downing et al. | 364/900 |
| 4,709,349 | 11/1987 | Hashimoto et al. | 364/900 |
| 4,847,749 | 7/1989 | Collins et al. | 364/200 |
| 4,907,150 | 3/1990 | Arroyo et al. | 364/200 |
| 4,912,670 | 3/1990 | Hattori | 364/900 |
| 4,947,397 | 8/1990 | Sobel et al. | 371/16.4 |
| 4,958,298 | 9/1990 | Okamoto | 364/519 |
| 5,010,514 | 4/1991 | Kippenhan et al. | 364/900 |
| 5,017,299 | 5/1991 | Farrell et al. | 355/207 |

(List continued on next page.)

FOREIGN PATENT DOCUMENTS

| | | | |
|---|---|---|---|
| 0 469 865 A2 | 2/1992 | European Pat. Off. | G06K 15/00 |
| 0 550 158 A1 | 7/1993 | European Pat. Off. | G06K 15/00 |

OTHER PUBLICATIONS

Network Printing Alliance Protocol, A Printer/Host Control Specification, Level 1, Revision N, Feb. 11, 1994, Developed By The Network Printing Alliance.

Lexmark WinWriter 600 User's Reference, Manual No. SA40–0779–00, 1993, Chapter 2 Using The Windows Printing System, pp. 11–26 and Chapter 3, Checking Print Status, pp. 27–39.

Common Printer Access Protocol (CPAP) Specification, Jun. 16, 1995, Digital Equipment Corporation.

*Primary Examiner*—Edgar S. Burr
*Assistant Examiner*—Steven S. Kelley
*Attorney, Agent, or Firm*—Ronald K. Aust; Frederick H. Gribbell

[57] ABSTRACT

An improved printer is provided that improves the response time before jobs are printer by providing a "fast data path" for certain print jobs while also storing on a hard disk all incoming print job data. This "fast data path" is especially useful in situations where the incoming print job lacks an "end of file" code, which could otherwise hold up the processing of either this print job or later print jobs. Once the printer becomes relatively busy, and begins to accumulate a "queue" of print jobs waiting to be processed and printed, the printer will automatically store all of the print job data on the non-volatile memory (e.g., a hard disk) before that same data is sent to the processing circuitry. Since it is important to utilize the printer's capabilities efficiently, the printer can allow a "small" print job to be processed and printed after being received from one input port of the printer, while a much larger print job is still being accumulated from a second input port, even though the larger job began to be received first. Since all print job data received by the printer of the present invention is stored in a non-volatile memory, the capability exists for recovering such print jobs after the occurrence of a power failure. Upon power restoration, a "Header File" that contains status information about stored print jobs will be inspected, and if a print job was never completely printed, the printer will now begin printing the entire job. In this manner, the printer can guarantee that the entire job will be printed in one intact grouping of sheets of paper.

24 Claims, 8 Drawing Sheets

U.S. PATENT DOCUMENTS

| | | | |
|---|---|---|---|
| 5,023,813 | 6/1991 | Brown, III et al. | 364/519 |
| 5,040,180 | 8/1991 | Rodi et al. | 371/66 |
| 5,056,018 | 10/1991 | Ikoma | 364/405 |
| 5,075,841 | 12/1991 | Kaneko | 395/575 |
| 5,113,355 | 5/1992 | Nomura | 395/109 |
| 5,131,077 | 7/1992 | Indei | 395/113 |
| 5,170,397 | 12/1992 | Hurtz et al. | 371/16.4 |
| 5,175,735 | 12/1992 | Dahlby et al. | 371/16.4 |
| 5,193,154 | 3/1993 | Kitajima et al. | 395/250 |
| 5,200,958 | 4/1993 | Hamilton et al. | 371/16.4 |
| 5,201,044 | 4/1993 | Frey, Jr. et al. | 395/575 |
| 5,208,814 | 5/1993 | Ulrich et al. | 371/16.4 |
| 5,327,526 | 7/1994 | Nomura et al. | 395/115 |
| 5,371,873 | 12/1994 | Niwa | 395/425 |
| 5,396,637 | 3/1995 | Harwell et al. | 395/750 |
| 5,408,589 | 4/1995 | Yamamoto | 395/101 |
| 5,445,459 | 8/1995 | Sasaki | 400/76 |
| 5,454,099 | 9/1995 | Myers et al. | 395/575 |
| 5,478,155 | 12/1995 | Sasaki | 400/76 |
| 5,524,186 | 6/1996 | Campbell | 395/115 |
| 5,550,957 | 8/1996 | Davidson, Jr. et al. | 395/114 |

METHOD AND APPARATUS FOR PROVIDING PRINT JOB BUFFERING FOR A PRINTER ON A FAST DATA PATH

TECHNICAL FIELD

The present invention relates generally to the use of a laser printer connected to at least one host computer, either directly via a parallel or serial port, or through a network. The invention is specifically disclosed as a method for buffering print job data and providing a "fast" data path within a printer, for the recovery after a power failure of print job data files that were earlier received by the printer, and for giving priority to smaller print jobs and faster interfaces to printer ports.

BACKGROUND OF THE INVENTION

Printers receive print data from a source, such as a single host computer or a network that contains at least one host computer or network server. Printers that are connected to a network can serve more than one host, and a single host computer connected to a network can access more than one printer. A recent development with respect to printers is the use of an internal network adaptor or other interface circuit that allows bi-directional communication with host computers.

Such bi-directional communication would typically be made using a protocol known as the Network Printer Alliance Protocol (NPAP), which provides a means for sending commands or status information, and also provides a means for sending print job data from a host computer to a printer using "NPAP packets." Such packetized print job data assists the receiving printer in determining boundaries between print jobs, so that the printer can more efficiently operate.

When a printer receives non-NPAP packetized print job data (i.e., typical print job information from a non-NPAP compatible host computer) or non-INA print job data, the receiving printer often has to "guess" when the end of a print job has occurred. This guessing may take the form of waiting for a given number of seconds after receiving the most recent data bits, and then finally assuming that the end of the print job has occurred. This obviously is not an efficient use of a printer's capabilities, since the time-out period is a true waste of time during which the printer could otherwise be processing and printing other print jobs that may be queued up in the network system.

The use of NPAP packetized print job information is one way to more readily determine the end of a print job. The NPAP capabilities of such laser printers, particularly Model 4039 Plus™ and Model OPTRA™, and ink jet printers, particularly Model 4079 Plus™, both types of printers being manufactured by Lexmark International, Inc., are quite broad. Details of the published Network Printer Alliance Protocol are contained in the NPAP Specification Level 1, Revision N, dated Feb. 11, 1994. This NPAP Specification is incorporated herein by reference.

Many conventional printers have no means of non-volatile storage to hold print job data. Hard disk drives and flash RAM have been included in some conventional printers, however, such memory storage devices are often used merely to hold fonts or macros. It would be desirable to also store print job data, especially if done so in a manner that would allow for the automatic printing of print jobs that were interrupted by a power outage situation, once power was restored.

Some conventional printers use non-volatile memory to store certain portions of print job data for later merging with additional print jobs that are received later, or for storing portions of print jobs that may be interrupted for one reason or another. For example, Sasaki (U.S. Pat. No. 5,478,155) provides a non-volatile flash RAM which can hold certain data. This data may be frequently used, and so may be repeatedly called from the flash RAM memory, where it can then be merged with other print data sent from an external device to produce a complete document. Such data could be a special font, or some type of form used to create specific documents. Another patent, U.S. Pat. No. 4,847,749 (by Collins), discloses a printer that detects a job interruption. When such an interruption occurs, the data is saved into a non-volatile memory. The jobs are marked so that they can be restarted at a pre-determined boundary.

Niwa (U.S. Pat. No. 5,371,873) discloses a printer that has a non-volatile memory that can be used to store print job data. The Niwa apparatus also allows printing to occur simultaneously with the storing of such print job data. This data is stored as bitmap, or converted (i.e., processed), data. After the particular print job has been completed, the Niwa apparatus can automatically delete that data from the non-volatile memory. To implement such memory storage during the printing of a job, the Niwa apparatus must receive an individual command for each print job received from a host computer.

Another patent that discloses storing converted data is by Donohue (U.S. Pat. No. 4,493,049). In Donohue, this converted, stored data can be read back into the normal memory of the printer before the printing procedure occurs, and also allows for such data to be merged with additional print job data that is being received by the printer and is being processed.

Conventional printers with multiple ports do not have the capability of inspecting those ports that are not currently processing a print job to see whether or not a smaller (or faster) print job is available that could be handled (i.e., processed and printed) while the current print job is still accumulating within the printer's input buffer. These conventional printers also do not provide the capability of storing non-converted data into non-volatile memory, and also do not automatically store all print job data into a non-volatile memory. Moreover, conventional printers do not provide a power recovery mode, whereby fully buffered print jobs (i.e., jobs that have been completely received by the printer and stored on the hard disk/non-volatile memory) are automatically printed in their entirety upon restoration of power.

Most conventional printers used in networks receive print jobs in chronological order, then process and print those print jobs in the same order as received, which also locks out all other ports on that printer from receiving data (thereby tying up those networks that are associated with the locked-out ports). If a printer has only a single port that is receiving data, then the above scenario of processing print jobs in the order received is normally the most logical scheme of operation. In scenarios where the printer has more than one port receiving data, however, there is merit in analyzing the incoming print job data so as to provide a "fast track" for fully buffered print jobs to be processed and printed while larger print jobs are still being accumulated on a different port, and also to provide a "fast data path" for print jobs that are received after a dormant period of printer operation.

SUMMARY OF THE INVENTION

Accordingly, it is a primary object of the present invention to provide a printer that improves the overall performance of job buffering by providing a "fast data path" for certain print jobs while also virtually simultaneously storing on a non-volatile memory device all incoming print job data.

It is another object of the present invention to provide a printer that stores all received print jobs in a non-volatile memory, where they remain until being verified as having been fully printed. Once such verification occurs, the print job data file(s) are automatically deleted from the non-volatile memory device.

It is a further object of the present invention to provide a printer that automatically prints data files, after restoration of power, containing print jobs that were stored in the non-volatile memory device before power was interrupted.

It is yet another object of the present invention to service more than one input port of the printer virtually simultaneously, so as to most efficiently service the various print jobs being received. In this manner, both smaller print jobs and print jobs being received via a faster communications link, can be processed and printed during the same time interval that a larger or slower print job is still being accumulated at a different of the printer's input ports.

It is still a further object of the present invention to provide a printer that automatically stores all received print jobs on a non-volatile memory device, and then prioritizes and processes incoming print jobs that become fully buffered on the non-volatile memory.

Additional objects, advantages and other novel features of the invention will be set forth in part in the description that follows and in part will become apparent to those skilled in the art upon examination of the following or may be learned with the practice of the invention.

To achieve the foregoing and other objects, and in accordance with one aspect of the present invention, a printer is provided that improves the overall performance of job buffering by providing a "fast data path" for certain print jobs while also storing on a non-volatile memory device all incoming print job data. During time periods when the printer is dormant (i.e., not processing or printing any print job), the present invention will automatically send the next print job to the print processing circuits before the corresponding print job data (for that same print job) is sent to the non-volatile memory for storage. This allows the printer to begin processing and printing this initial print job without waiting for that same print job's data to first be written to the non-volatile memory, and then read back from that same non-volatile memory. This "fast data path" is especially useful in situations where the incoming print job lacks an "end of job" indication, which would hold up the processing of either this first print job or later print jobs in a conventional printing system. By passing the print job data to the Emulators and Datastream Interpreters immediately, these additional functions within the printer of the present invention can assist in determining the end of a job (i.e., by looking at parameters other than a relatively long time-out period waiting for new data to arrive).

The printer of the present invention preferably uses a multitasking operating system so that it can simultaneously process incoming print job data from more than one port. Once the printer becomes relatively busy, and begins to accumulate a "queue" of print jobs waiting to be processed and printed, the printer will automatically store all of the print job data on the non-volatile memory (e.g., a hard disk) before that same data is sent to the processing circuitry.

If data is arriving at one of the printer's ports (i.e., the "active port") and being buffered on the disk faster than it can be processed and printed, there is no point in providing a "fast data path" to the datastream interpreters that process the print job data, since the combination of the datastream interpreters, graphics engine, and print engine is now backed up, and temporarily becomes the slowest operation in the overall printer system. Further, in this circumstance, it is generally more important to utilize the printer's capabilities efficiently, and it may be quite desirable to allow a fully buffered print job to be processed and printed after being received from one input port of the printer, while a much larger print job is still being accumulated from a second input port, even though the larger job began to be received first. The reception of a very large print job otherwise could bog down the printer to such an extent that, although the print engine may have completely finished a previous print job, it is nevertheless possible for a new, large incoming print job to still be arriving at the "second" input port, and so, for a time period, the Datastream Interpreters, Graphics Engine, and Print Engine are temporarily unused. Since these items are typically among the slowest functions of a printing system, it is desirable to try to keep them in operation at peak efficiency during time periods when a queue of print jobs has accumulated at this printer.

The preferred printer of the present invention, having a multitasking operating system, has the capability of receiving print jobs from multiple input ports simultaneously. While these print jobs are being received, they are stored automatically in the non-volatile memory. As soon as the Datastream Interpreters are available for accepting a new print job, the print job that is already fully buffered will be the next job to be sent through the Datastream Manager into the Datastream Interpreters, thereby providing a "fast track" for this next job. This print job may well be a relatively small file in size (in bytes) that did not begin being received by this printer until after a much larger print job was already being received. However, since the larger print job did not become fully buffered first, the smaller print job can be sent through the Datastream Manager to the Datastream Interpreters in advance of the larger print job, thereby more efficiently utilizing the throughput capabilities of some of the slowest components of the printer (i.e., the processing and printing components). Another possibility is that two "large" jobs are being received substantially simultaneously at two different ports, and one of the ports is much "faster" than the other (e.g., its network has a greater communications data rate) so that its "large" print job becomes fully buffered first.

Since all print job data received by the preferred printer of the present invention is stored in a non-volatile memory, the capability exists for recovering such print jobs after the occurrence of a power failure. Of course, this power failure could be accidental (by the circumstance where the incoming utility power has been interrupted), or could be purposeful when a user turns off the printer. In either circumstance, once a print job is fully buffered on the non-volatile memory, the printer of the present invention will send an NPAP message to the originating host computer (i.e., the host which originally transmitted that particular print job) in the form of an acknowledgement message that essentially allows the host computer to be assured that the job ultimately will be printed. Of course, if no power failure occurs, that particular print job will be printed in due course.

On the other hand, if power is lost before this particular print job has been entirely printed, this fully buffered print job will remain in the non-volatile memory indefinitely until the power has been restored. Upon power restoration, a "Header File" that contains status information about this print job will be inspected, and if the print job was never completely printed, the printer will now begin printing the entire job. It is preferred that the print job data file automatically be deleted from the non-volatile memory once the print job has been verified as having been completely printed. This status information is part of the information that is included in the header file. In situations where the particular print job has been partially printed before the power failure occurred, the printer will nevertheless print the entire job upon restoration of the power. In this manner, the printer can guarantee that the entire job will be printed in one intact grouping of sheets of paper.

Still other objects of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
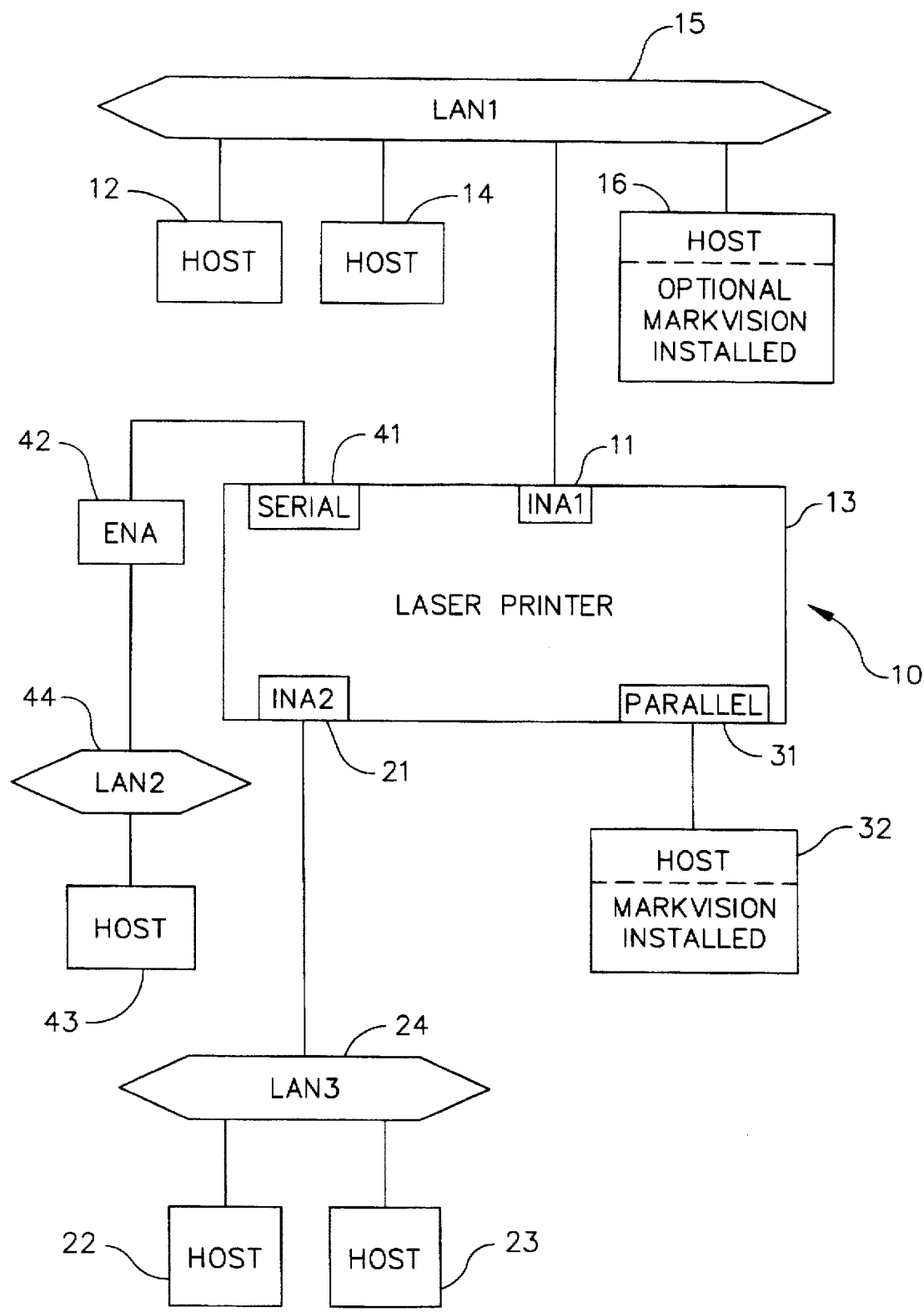
FIG. 1 is a diagrammatic view of a printing system having multiple host computers connected to multiple communications ports of a single laser printer, as relevant to the present invention.

Referring now to the drawings, FIG. 1 shows an exemplary circuit configuration generally designated by the index numeral 10, depicting a laser printer 13 connected to several host devices through the printer's various communications ports. The illustrated laser printer can have up to four such communications ports, including a network port connected via an internal network adapter (INA) 11, a second INA 21, a parallel port 31, and a serial port 41. The preferred INA 11 and INA 21 (referred to herein as INA1 and INA2, respectively) are mounted within the printer housing, and are of a type described in a co-pending commonly-assigned U.S. patent application, Ser. No. 08/350,860, titled MULTIPLE VIRTUAL PRINTER NETWORK INTERFACE, filed on Dec. 7, 1994, and which is expressly incorporated by reference herein. It will be understood that the present invention could also be implemented using other types of printers (including ink jet printers) having a communications port with a bi-directional capability.

INA1 and INA2 are connected to various host computers through a network, such as the local area networks (LANs) designated by the index numerals 15 and 24. Local area network 15 is designated as LAN1, through which laser printer 13 communicates via INA1 to host computers 12, 14, and 16. LAN 24, designated on FIG. 1 as LAN3, is used to carry communications between laser printer 13 and host computers 22 and 23 via INA2. It will be understood that these local area networks are available from several manufacturers, and that other configurations and other numbers of host computers can be attached to laser printer 13 without departing from the principles of the present invention.

Another local area network designated by the index numeral 44 is depicted on FIG. 1 and is connected to serial port 41 via an external network adapter (ENA) 42. The external network adapter 42 performs many of the same functions as the internal network adapters 11 and 21. The preferred ENA 42 is of a type described in a co-pending commonly-assigned U.S. patent application, Ser. No. 08/494,045, titled EXTERNAL NETWORK ADAPTER FOR HANDLING NORMAL AND ALTERNATE CHANNEL DATA OVER A SINGLE BI-DIRECTIONAL CHANNEL CONNECTED TO A PRINTER, filed on Jun. 23, 1995, and which is expressly incorporated by reference herein. Host computer 43 is connected to laser printer 13 via the serial port 41, ENA 42, and LAN2 (designated by index numeral 44). Another host computer designated by the index numeral 32 is directly connected to laser printer 13 via parallel port 31.

The various host computers depicted on FIG. 1 can be installed in close proximity to printer 13 or can be placed in locations quite remote from printer 13 as widespread in practical use, for example, as throughout an entire building or several buildings. Host computer 32 would typically be located in relative close proximity to printer 13 since its connection is directly through the printer's parallel port 31. Each of the host computers would typically be a personal computer or a workstation, such as a personal computer manufactured by IBM, and laser printer 13 is preferably a model OPTRA™ manufactured by Lexmark International, Inc., located in Lexington, Ky.

At least one of the host computers preferably contains a computer program named MARKVISION®, one version of which is a WINDOWS™ compatible program manufactured by Lexmark International, Inc. located in Lexington, Ky. On FIG. 1, host computer 32 specifically has MARKVISION installed to collect job accounting information from printer 13. One or more of the other host computers, such as host computer 16, can additionally have MARKVISION installed within.

It will be understood that computer programs other than MARKVISION may also have the capability to transmit print jobs to laser printer 13, as well as to other printers of various types, without departing from the principles of the present invention.

It is preferred that printer 13 has bi-directional communications capabilities and operates according to the industry standard known as the Network Printing Alliance Protocol (NPAP). The NPAP includes a capability in which a particular manufacturer can provide optional features using "extensions," in which each extension includes a command that will be properly understood only by that particular manufacturer's printer. For example, extensions used by Lexmark printers may include in each command packet communicated over the LAN 15 a command byte having a value of E0 in hexadecimal. Printers manufactured by Lexmark International Inc. will respond to such commands written under the Lexmark extension, but printers manufactured by other companies would usually ignore any packet that contained the E0 command byte.

In the illustrated system, the network operating system is Novell Netware 2.2, 3.11, or later. The host computers operating on the Novell operating system network are set up to send NPAP-compliant commands to a particular "socket," or logical address, of network specific hardware that is included in the Internal Network Adapters 11 and 21. Therefore, non-NPAP information, received at a different socket, can be transferred to the printer port of the INA's 11 or 21 without processing, in the manner that NPAP commands are processed by the microprocessor of the INA.

Figure 2:
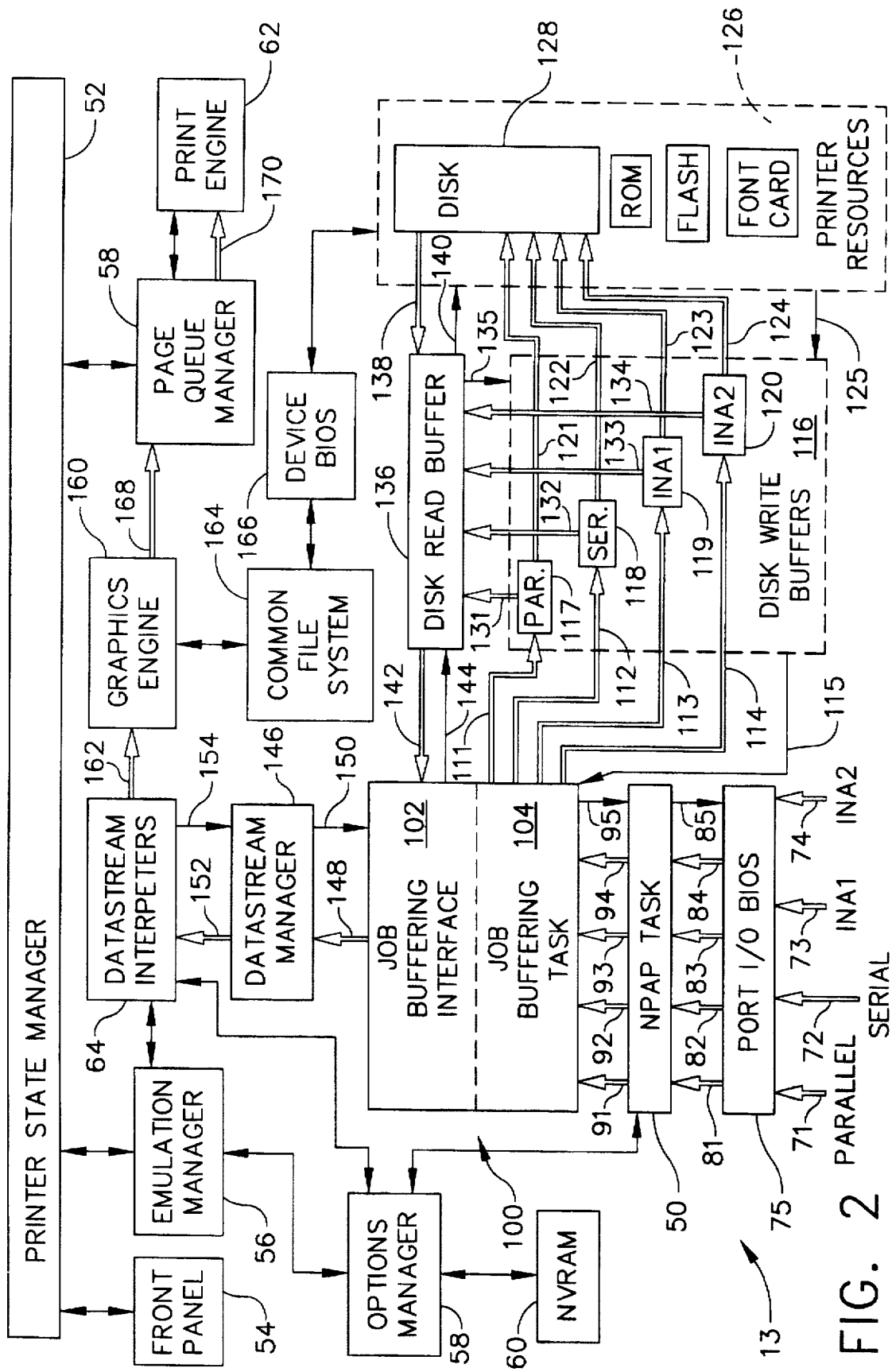
FIG. 2 is a combination block diagram and functional block diagram of the laser printer as used in the printing system of FIG. 1, and as relevant to the present invention.

With reference now to FIG. 2, the laser printer 13 as configured for use with the present invention includes a printer controller, relevant portions of which are shown functionally. The microprocessor-based controller performs functions which include a number of tasks, the relevant ones of which are indicated in the figure, and has access to a number of libraries of code which may be called by the tasks to perform various functions. The tasks are activated by timer counts or interrupts to perform functions, as shall be described hereinbelow.

The exemplary printer controller is capable of effecting the usual printer functions such as maintaining a control panel, interpreting incoming print jobs received in one or more printer control languages, and rasterizing and serializing the interpreted data to drive a laser printer engine. The exemplary controller includes the ability to communicate through parallel, serial and network ports bi-directionally using NPAP. The principal task for handling NPAP-compliant commands and data is the NPAP Task 50.

The NPAP Task 50 performs the functions of handling commands and data that are in the NPAP format. NPAP Task 50 supplies printer status information to direct-attached and network-attached host computers and receives requests for such information from the host computers. A more complete description of a preferred NPAP task used in a printer is described in a co-pending commonly-assigned U.S. patent application, Ser. No. 08/493,884, titled METHOD AND APPARATUS FOR PROVIDING JOB ACCOUNTING INFORMATION TO A HOST COMPUTER FROM A PRINTER, filed on Jun. 23, 1995, and which is expressly incorporated by reference herein.

The NPAP Task may be "On", "Off" or "Auto" for each port, whether it is a serial, parallel, or INA-type port. If the NPAP Task 50 is active (i.e., either ON or AUTO), then the "Job Buffering" function of laser printer 13 may be enabled, via a command sent by one of the host computers. The Job Buffering "Enable" command can be selectively designed to turn Job Buffering on for only certain of the input ports of the laser printer (i.e., the parallel, serial, or INA ports). Alternatively, Job Buffering for any port(s) can be enabled by use of the printer's operator front panel 54, regardless of whether or not the NPAP Task 50 is active. For maximum overall printer throughput, it would be recommended that all of the relatively active input ports have the Job Buffering function enabled.

It will be understood that other hardware and software configurations for implementing the laser printer 13 could be substituted for the illustrated embodiment without departing from the principles of the present invention. This is particularly true for the arrangement of software/firmware used by laser printer 13, as depicted in FIG. 2—the Options Manager and its method of controlling the NVRAM could be designed to operate in various manners, while still effectively performing the same tasks.

The preferred laser printer 13 will include an operator control panel which can be either manually-accessed by a local user, or remotely-accessed by a Network Administrator. Such laser printers are currently available, as described in a co-pending commonly-assigned U.S. patent application, Ser. No. 08/394,086, titled REMOTE REPLICATION OF PRINTER OPERATOR PANEL, filed Feb. 24, 1995, and which is expressly incorporated by reference herein.

It will be understood that the precise embodiment illustrated in FIG. 2 is not required to perform the functions of the present invention, however, to utilize the NPAP industry standard, a laser printer must have bi-directional communications capability, and it must have the capability to store job accounting information in memory. Furthermore, such a laser printer should have the capability of storing incoming print jobs (as data files) onto an internal hard disk drive (or other non-volatile read/write memory storage device).

The Printer State Manager, designated by the Index Numeral 52, oversees at a high level the various tasks or functions being performed within laser printer 13. This includes receiving signals from and sending information to the front panel 54, and overseeing the operation the Emulation Manager 56 and Page Queue Manager 58.

The Emulation Manager 56 shares information with the Options Manager 58, which in turn, controls the NVRAM 60. The Page Queue Manager 58 controls the operations of the Print Engine 62, and also transmits print job data in a bitmap format to the Print Engine 62, typically in a one-page chunk of bitmap print data.

The portions of laser printer 13 described immediately above will not be further described in greater detail herein, since they are not closely related to the functions performed by the present invention. While the Emulation Manager 56 and Options Manager 58 control the Datastream Interpreters, designated by the index numeral 64, this control will only be generally described as necessary, hereinbelow.

On FIG. 2, the four input ports are designated by the index numerals 71, 72, 73 and 74, which correspond to the parallel port, serial port, INA1 port, and INA2 port, respectively. Each of these ports interfaces to a "Port I/O BIOS" designated by the index numeral 75. This Port I/O BIOS 75 communicates, via four separate data paths (designated by the index numerals 81, 82, 83, and 84) to the NPAP Task 50. These data paths 81–84 correspond directly to the four input ports 71–74. The NPAP Task 50 can also communicate status and control information via a path 85.

NPAP Task 50 further communicates print job data to the Job Buffering function using data paths 91, 92, 93, and 94, which respectively correspond to the four input ports 71–74. NPAP Task 50 can receive control and status information via another data path 95.

The "Job Buffering" function, designated by the index numeral 100, can be logically divided into two portions: a Job Buffering Interface 102, and Job Buffering Task 104. As print jobs are transmitted through the NPAP Task 50, they are received by Job Buffering Task 104, which controls the timing between the print job data pathways 91–94 and the similar print job data pathways 111–114 between the Job Buffering Task 104 and the Disk Write Buffers 116. In the illustrated embodiment of FIG. 2, there are four separate Disk Write Buffers, designated by the index numerals 117, 118, 119 and 120, which correspond respectively to the input ports 71–74. The Disk Write Buffers 116, as an overall task and set of hardware elements, controls the transmitting of data into its individual buffers 117–120, using a status and control line 115. Each of the individual Disk Write Buffers 117–120 preferably comprises a section of dynamically allocated RAM, 32 Kbytes in size. It will be understood that such RAM section will be allocated only for ports that presently are enabled for Job Buffering.

In the illustrated embodiment, the individual Disk Write Buffers 117–120 will be used to transfer data onto a hard disk, which is a non-volatile memory storage device and a member of the overall printer resources, designated by the index numeral 126, of laser printer 13. This transfer would occur via individual print job data communication pathways, designated by the index numerals 121, 122, 123 and 124, which correspond to the input ports 71–74. The printer resources function 126 controls the rate of data transfer from the individual Disk Write Buffers to the hard disk, using a command and status control line 125.

In situations where the print job data has been transferred to the hard disk 128 from the individual Disk Write Buffers 117–120, this information will typically then be further transferred off the hard disk 128 into a Disk Read Buffer 136, via a print job data pathway 138. Control of this data transfer is accomplished by a control and status communications line 140. Once print job data has accumulated in the Disk Read Buffer 136, the data will then be transferred, as needed, into the Job Buffering Interface 102, via a print job data pathway designated by the index numeral 142. The transfer of data from Disk Read Buffer 136 via the print job data pathway 142 is controlled by the Job Buffering Interface 102, via a command and status signal line 144.

It will be understood that the data and control lines 121–125, and 138 and 140 can be either directly connected to hard disk 128 (as depicted in FIG. 2), or can be routed through the Common File System 164 (and Device BIOS 166) without departing from the principles of the present invention. One successful implementation of Job Buffering has been achieved by routing these data lines through the Common File System 164.

In situations where the Disk Read Buffer 136 and the Datastream Manager 146 are available to accept new data (as discussed in detail below), then the contents of one of the individual Disk Write Buffers 117–120 can potentially be directly transferred into the Disk Read Buffer 136. This would occur via one of the print job data pathways 131, 132, 133, or 134, which correspond to the input ports 71–74, respectively. Such transfer between the Disk Write Buffers and the Disk Read Buffer would be under the control of the Job Buffering Task 104 and Job Buffering Interface 102, and by a command and status line 135. As discussed in detail below, this "direct" transfer between the read and write buffers would occur only if the available print job data in one of the Disk Write Buffers 116 has not yet had a chance to be transferred onto the hard disk 128. This function corresponds to the "fast data track" which allows the particular print job to be "quickly" transferred into the Datastream Manager 146, so that it can be processed and printed as soon as possible.

The illustrated embodiment of laser printer 13 will, nevertheless, still copy the contents of this particular Disk Write Buffer onto the hard disk 128, even though those same contents are already being processed after having passed through Datastream Manager 146. This transfer to the hard disk 128 is necessary only to recover from a potential power failure either before or during the printing procedure for this particular print job. As related below, once the Print Engine 62 has verified that the print job has been completely printed, a signal (or flag) will be provided to inform the Job Buffering Task that it should now delete this particular print job from hard disk 128. Under that circumstance, the data associated with this print job will never be transferred from hard disk 128 into the Disk Read Buffer 136 via the print job data pathway 138 (since this print job has already been printed).

It will be understood that the various "command", "control", and/or "status" lines shown on FIG. 2 are not necessarily hardware signal paths. In most cases, these lines represent software flags or variable values that are used to determine the exact condition of the appropriate buffers or tasks within printer 13.

Once Job Buffering Interface 102 receives print job data from the Disk Read Buffer, it transfers the print job data to the Datastream Manager, designated by the index numeral 146, via a print job data pathway 148. Datastream Manager 146 controls the flow of this print job data via command and status line 150. The print job data is further communicated to the Datastream Interpreters 64 via a print job data pathway 152. Command and status information concerning the Datastream Interpreters 64 is passed to the Datastream Manager 146 via a status and control line 154.

Once the Datastream Interpreters 64 have processed the print job data, that print job data is transferred to a Graphics Engine designated by the index numeral 160, via a print job data pathway 162. Graphics Engine 160 further processes the print job data, while potentially accessing the printer resources 126 via the "Common File System" 164 and the device BIOS 166. Such accessed information could include different font types, macros, or other types of information typically used by conventional laser printers. Once the Graphics Engine 160 has completed its tasks, the print job data is further transferred via a print job data pathway 168 to the Page Queue Manager 58. As related above, Page Queue Manager 58 determines when to send an entire page of bitmap information to the Print Engine 62, and this communication is via a print job data pathway 170.

It will be understood that many of the functions or tasks, along with the associated hardware, depicted in FIG. 2 are also found in conventional laser printers. The present invention mainly concerns itself with the Job Buffering task 100, which intimately uses the individual disk write buffers 117–120, the disk read buffer 136, and all of the various print job data pathways therebetween, specifically including data pathways 111–114, 121–124, 131–134, 138, and 142.

Figure 3:
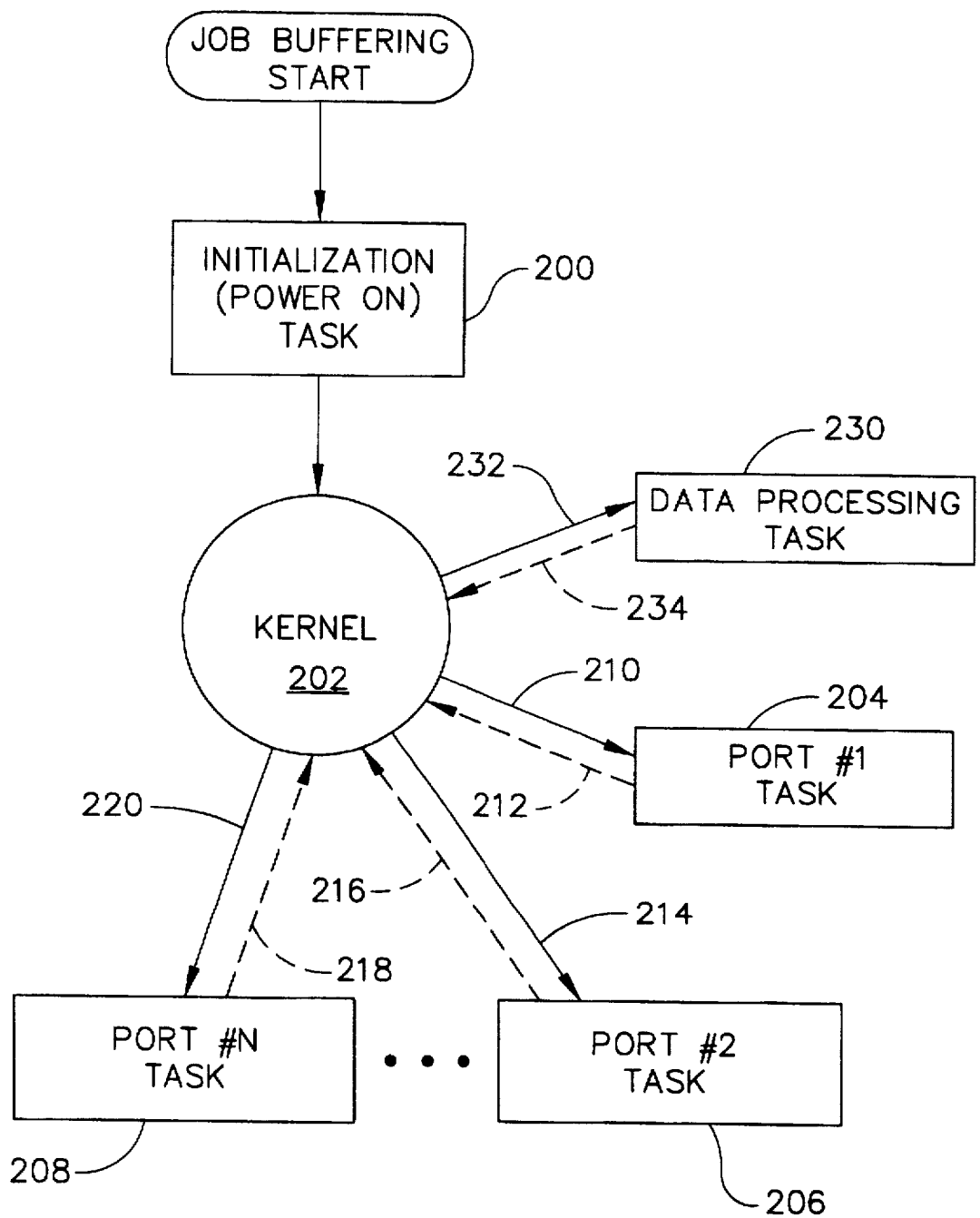
FIG. 3 is a flow chart showing the multitasking kernel and the major tasks that are called by the kernel, when appropriate, to implement the "Job Buffering" functions of the present invention.

In FIG. 3, the tasks relating to the job buffering functions of the present invention are depicted in general terms, including the major tasks that can be virtually simultaneously executed by the multitasking operating system of laser printer 13. It will be understood that the terminology "virtually simultaneously executed" refers to the fact that the various Job Buffering operations or tasks performed by laser printer 13, according to the principles of the present invention, will appear to be executing essentially in parallel with one another with respect to the time domains involved for completing each of these tasks. While the preferred multitasking operating system of laser printer 13 cannot literally perform each of these tasks in parallel (since it is based upon a single sequential microprocessor), it will be understood that many "small" sub-tasks can be executed by this single microprocessor by continually jumping between the major tasks to perform only certain portions of those major tasks during any one (brief) time interval that a particular task has priority. The description herein of the operations of the Job Buffering feature of the present invention is based upon the design criteria that the microprocessor of laser printer 13 functions quickly enough to keep ahead of all of the tasks performed, not only for Job Buffering, but also for all the other functions that must occur within a laser printer.

Figure 4:
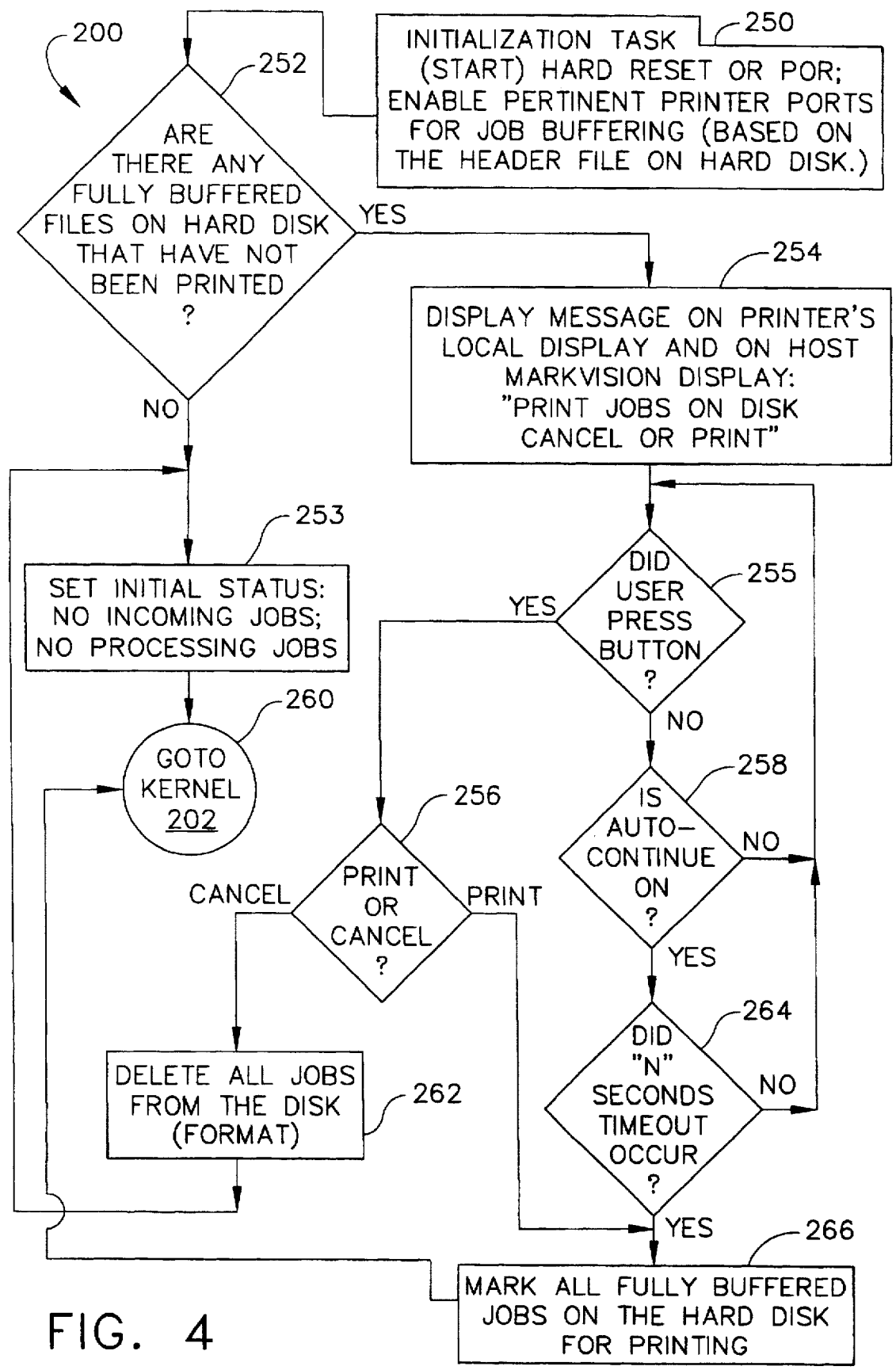
FIG. 4 is a flow chart of the "Initialization Task" used by the Job Buffering function of the present invention.

The initial portion of the Job Buffering task that is executed after a "hard" reset, or a "power on reset" (POR), is depicted as the "Initialization Task" 200. A flow chart describing the functions of Initialization Task 200 is provided on FIG. 4. After either type of reset, if Job Buffering had been enabled for a particular port at an earlier time, an indication that it was enabled would currently be stored in a "Header File" on the hard disk 128. Function block 250 will immediately, upon reset, look to this Header File for that information.

The logic flow follows to a decision block 252 that determines whether or not there are any fully buffered files on the hard disk 128 that have not been printed. After an interruption of services at laser printer 13, particularly due to a power outage, it is quite possible that the hard disk 128 contains one or more fully buffered print job files that had not previously been entirely printed. If decision block 252 determines that there are no such files, then the logic flow is directed out the NO exit to a function block 253 that sets the printer's initial status as having no incoming print jobs, and no jobs currently being processed. The logic flow then returns to kernel 202 at block 260.

If there are fully buffered files on the hard disk that previously were not completely printed, the logic flow follows to a function block 254 that causes a message, "PRINT JOBS ON DISK," to be placed on the printer's local panel display. In addition, the laser printer 13 will send an NPAP message to host computers that are running MARKVISION, and such a host will place a message on its monitor display, "PRINT JOBS ON DISK." When this occurs, the user of the printer can press a button (detected by decision block 255) at the printer's front panel 54, to either cancel the upcoming print jobs, or can tell the printer to definitely print those print jobs that are residing on the hard disk. This is determined by decision block 256. If the local user (i.e., at the printer 13) has chosen the "CANCEL" choice at decision block 256, the logic flow will travel out the CANCEL exit from decision block 256, which directs the logic flow to a function block 262 where the Job Buffering partition of hard disk 128 will be cleared. It is preferred that, if the Job Buffering partition is to be cleared, that it instead be formatted, because that procedure takes less time then the "clearing" of a hard disk partition. Once this clearing or formatting has occurred, the logic flow is directed back to function block 253, which sets the initial status.

Additionally, one of the attributes of the Job Buffering function is designated "Auto-Continue." Decision block 258 determines whether or not the Auto-Continue attribute has been earlier turned on, and if the answer is NO, then the logic flow travels along the NO exit back to decision block 255. In the situation where Auto-Continue was previously enabled, and the local user (i.e., at the printer 13) has made no selection between the choices of "Print Job" or "Cancel," the logic flow will travel out the YES exit from decision block 258, to a decision block 264. Once the logic flow arrives at function block 264, it determines whether or not a timer set to "n" seconds has timed out. A typical time delay for this to occur may be as little as five seconds. If the time period has not run, the logic flow is directed back to decision block 255.

Assuming that no choice is made at decision block 256, then after n seconds has expired, function block 264 will direct the logic flow to function block 266, at which time all fully buffered jobs that currently reside on the hard disk will then be printed by laser printer 13. Each of these jobs will be printed in full, even if one of the jobs had been partially printed before the interruption in service (i.e., perhaps because of a power failure). Once all the jobs have been printed, the logic flow will be directed back to kernel 202.

If, during this time-out period, the local user selects the "Cancel" choice at decision block 256, then the control logic will immediately change so that the logic flow will be directed to function block 262, and the job buffering partition will be cleared. However, if the user selects the "Print Job" choice at decision block 256, then the logic flow will immediately change to the PRINT exit from decision block 256 so that the logic flow arrives at a function block 266, to mark for printing all of the fully buffered jobs. However, if Auto-Continue was not previously turned on (i.e., it is currently disabled), and if the local (i.e., at the printer 13) user does not make a selection of either "PRINT JOB" or "CANCEL," then printer 13 will hang up and will not further operate until the local user finally makes a selection from these two above choices. The logic flow would be "stuck" in a loop, travelling through blocks 255 and 258, and would not exit from this loop until a button was pushed to choose either PRINT or CANCEL. It will be understood that, once one or more jobs have been "marked" for printing, those jobs will be printed by printer 13 substantially simultaneously while other Job Buffering tasks are being executed.

Assuming at least one of the ports 71–74 of laser printer 13 has had its job buffering functions enabled, the multitasking Job Buffering kernel 202 will begin to operate. As related above, it will be understood that the flow chart of FIG. 3 is depicting only the high-order concepts of a multitasking system, since it is well known in the art to jump between sub-tasks in a multitasking system, and a highly detailed description of a low-order "priority-driven" multitasking system will not be provided herein. In the flow chart of FIG. 3, it will be understood that each of the four major tasks that can be commanded by the kernel 202 all have essentially equal priorities, and that all four tasks can be virtually simultaneously executed in real time, at least with respect to the actual operating time intervals that are pertinent to the description of the present invention. Of course, when using a single processor architecture (which is preferred for the present invention), a single microprocessor can only operate as a sequential device, executing only a single task at a given moment. However, for the purposes of the description of the present invention herein, it is assumed that the microprocessor has sufficient speed and processing power to keep abreast of all four tasks shown on FIG. 3 so that they appear to be operating in parallel, at least with respect to being able to operate on print job data as it is transferred throughout the various buffers and memory storage devices of laser printer 13.

The principles of the present invention can be best understood when assuming that at least two of the input ports 71–74 have been "enabled" for Job Buffering. For the purposes of this disclosure, it will be assumed that at least three ports have been enabled for Job Buffering, and they correspond to the "Port #1 Task" 204, "Port #2 Task" 206, and "Port #n Task" 208. These three ports can correspond to any of the four input ports 71–74 that are depicted on FIG. 2, and for the purposes of this disclosure, it makes no difference which of the physical input ports 71–74 correspond to Port #1 or Port #2, for example. The kernel 202 controls the operation of these port tasks, typically by software function calls, which are depicted as flow chart arrows 210, 214, and 218. The various port tasks report status information back to kernel 202, typically via either changing the state of flag variables or by use of software interrupts, either of which essentially transfer information to the kernel, as represented by flow chart arrows 212, 216, and 220 on FIG. 3.

Kernel 202 calls the "Data Processing Task," designated by the index numeral 230, by use of a function call depicted as flow chart arrow 232 on FIG. 3. A corresponding software interrupt or flag status change from this task 230 can be generated, as depicted by the flow chart arrow 234.

Figure 5:
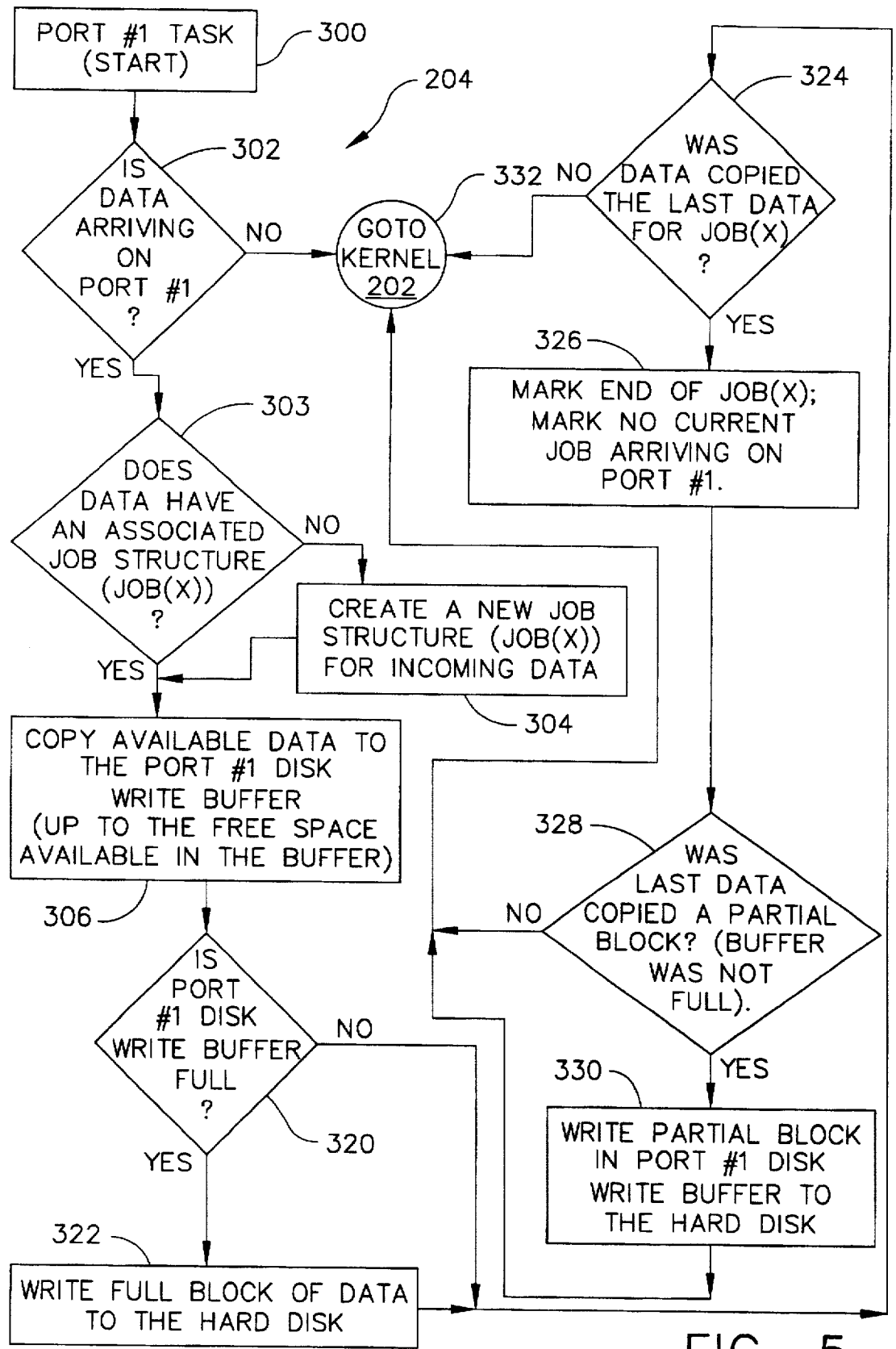
FIG. 5 is a flow chart of the "Port #1 Task" that can be called by the kernel of FIG. 3, according to the principles of the present invention.

FIG. 5 depicts the flow chart for the Port #1 Task 204. This task is called by kernel 202 via a function call that starts at block 300, in which the logic flow is directed to a decision block 302 that determines whether or not any data is currently arriving at Port #1. If the answer is NO, the logic flow travels back to kernel 202 at block 332. If the answer is YES, the logic flow is directed to another decision block 303, which determines whether or not the incoming data already has a "job structure" assigned. If the data arriving at Port #1 is the first packet of a particular print job, then a job structure would not yet exist for this "new" job. In that circumstance, the logic flow is directed out the NO exit to a function block 304, where a job structure is then assigned to that print job, and for the purposes of describing the flow chart of FIG. 5, this job structure is referred to as "Job (X)".

If a job structure for this particular print job was already in existence (i.e., the data arriving at Port #1 is for a later packet of data for the same existing print job) at decision block 303, then the logic flow is directed out the YES exit, and the term "Job (X)" continues to be used for this current job. Once the job structure exists, the logic flow travels to a function block 306 that begins copying this data into the Disk Write Buffer #1, designated by one of the index numerals 117–120. The individual Disk Write Buffers 117–120 each are preferably 32 Kbytes in size, so that a relatively large amount of data can be transferred to the hard disk 128 during a write operation. In general, the larger the size of the block of data being written to or read from a hard disk, the greater the throughput capacity, and it is important to match the hard disk's throughput capacity so that it exceeds the throughput capacity of other portions of the laser printer 13.

With the desired throughput capacity in mind, it is preferred that no print job data be written to the hard disk 128 until the individual Disk Write Buffer is completely full (i.e., it contains 32 Kb of data) so as to most efficiently use the hard disk's throughput capabilities, even though some print jobs that may be smaller than 32 Kb in size, and will not complete the task of filling the Disk Write Buffer. Many print jobs are greater than 32 Kb in size, and their contents will be first transferred into the appropriate Disk Write Buffer until it becomes full, then written onto the hard disk 128 as a full 32 Kb "block" of data. Each subsequent block of data received by this Disk Write Buffer will be written to the hard disk 128 as a 32 Kb block. In most cases, the "final" portion of data for an individual print job will not precisely fill the Disk Write Buffer, so after an "end of job" determination is made, the final portion of data will be written as a full 32 Kb block of data to the hard disk 128, and the final portion of the print job data will be merged with "empty" space to come up to the 32 Kb block size. The "empty" area of this 32 Kb final block will contain invalid data.

On the flow chart of FIG. 5, these operations are described as follows: a decision block 320 determines whether or not the Disk Write Buffer is full for Port #1. This Disk Write Buffer physically would be equivalent to one of the Disk Write Buffers 117–120 on FIG. 2. If the pertinent Disk Write Buffer is now full, then the logic flow is directed to a function block 322 that writes a full block of data to the hard disk 128. After this data has been written, the logic flow travels to another decision block 324. If the Port #1 Disk Write Buffer is not full, then the logic flow is directed out the NO exit to the same decision block 324.

Decision block 324 determines whether or not the data copied into the Port #1 Disk Write Buffer was the "last" data for Job (X). In making this determination, the Job Buffering function looks for an "end of file" code, which would likely exist if Job (X) consisted of NPAP-packetized data, however, may not exist for a non-packetized print job. If no end of file code is found, then other means of determining whether this was the final data must be used, including the use of a time delay where no data is received at Port #1. If the answer at decision block 324 is NO, then the logic flow is directed back to the kernel 202 at block 332. If the answer is YES, then the logic flow travels to a function block 326 that "marks" the end of Job (X) in the job structure. This function block also "marks" (to printer 13) that no current job is now arriving at Port #1.

The logic flow is now directed to a decision block 328 which determines whether or not the last data copied at into the Port #1 Disk Write Buffer was a "partial" block (i.e., less than 32 Kb). If the answer is NO, then the logic flow is directed back to the kernel 202 at block 332. If the answer is YES, the logic flow travels to a function block 330 that writes a partial block of data to the hard disk 128. As related above, this "partial" block will actually be 32 Kb is size (where the extra bytes are invalid data) in the preferred embodiment, in order to always write the same size block of data to the hard disk 128. In this manner, data files on the hard disk 128 can be opened to be always expecting only data blocks of the same 32 Kb size, which allows for a greater throughput capacity. Of course, this final "partial" block will have an "end of job" mark that separates the true data from the invalid portion of the block.

Figure 6:
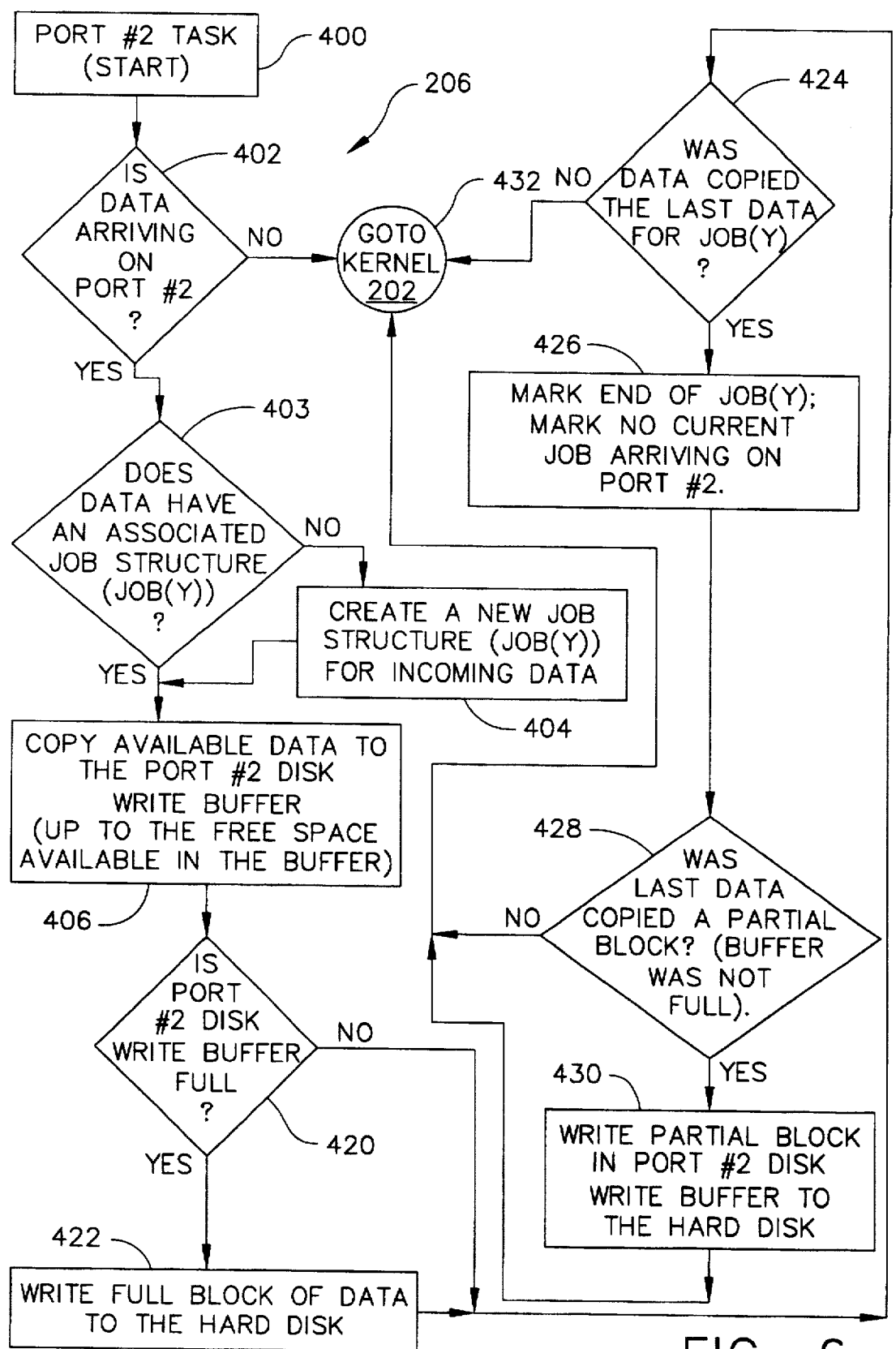
FIG. 6 is a flow chart of the "Port #2 Task" that can be called by the kernel of FIG. 3, according to the principles of the present invention.

FIG. 6 is a flow chart of the Port #2 Task 206, which is virtually identical to the Port #1 Task 204, depicted in FIG. 5. Port #2 could be any of the other input ports 71–74, and the Job (Y) associated with Port #2 is essentially the same type of print job data as Job (X), which is associated with Port #1. The Disk Write Buffer #2 physically is one of the other individual Disk Write Buffers 117–120, but is associated with Port #2. The precise same description provided for in the flow chart operations of FIG. 5 applies to the Port #2 Task 206 flow chart of FIG. 6, and will, therefore, not be completely reiterated in this disclosure. FIG. #6 is provided herein to make clear that each of the several ports that can be utilized by laser printer 13 can have the Job Buffering features that provide a "fast data track" between the input buffers (e.g., the Disk Write Buffers 116) and the Print Engine 62 (via Disk Read Buffer 136, Datastream Manager 146, Datastream Interpreter 64, Graphics Engine 160, and Page Queue Manager 58).

It will be further understood that both Port #1 Task 204 and Port #2 Task 206 occur virtually simultaneously and essentially in parallel, due to the multi-tasking nature of the laser printer 13 microprocessor system. When the logic flow is directed back to the kernel 202 (at, e.g., block 332 or 442), the kernel 202 is essentially being told to go inspect the other system tasks, including looking at other ports to see if more data is arriving at this time, or to discover whether or not there is a fully buffered job on the hard disk from another port. The purpose of these logical decisions is to both speed up the transfer of data from the input ports to the Print Engine, and to also preserve the data on the hard disk in case of a power interruption. As related above, once a particular print job has been verified as having been completely printed by Print Engine 62, its corresponding data file on hard disk 128 will be automatically deleted by the Job Buffering Port Tasks (not shown on the drawings). This particular function does not appear on the flow charts of FIG. 5 or FIG. 6, because these flow charts are more directed to servicing the data that is arriving at their respective ports.

Figure 7A:
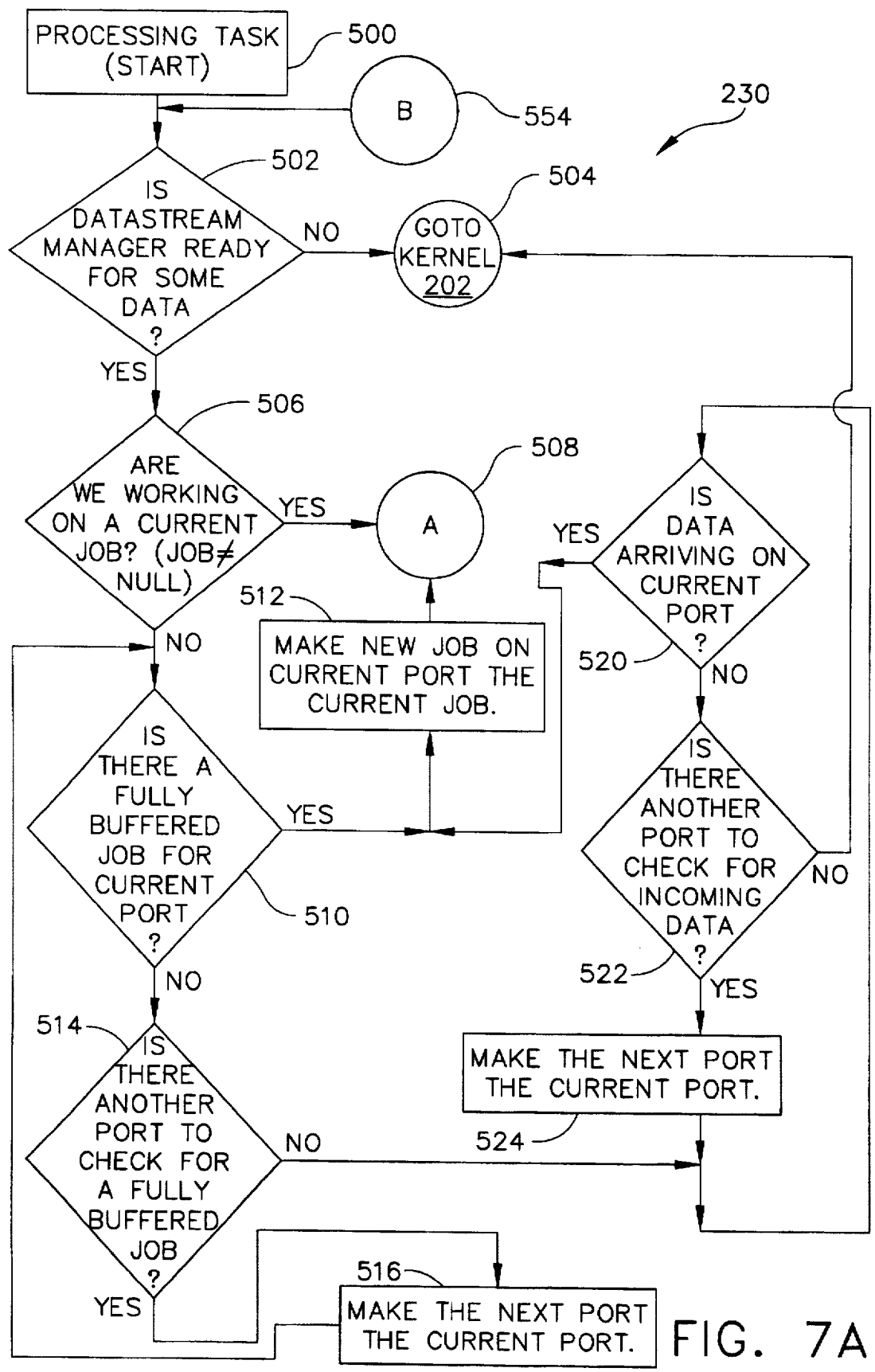
FIGS. 7A and 7B are a flow chart for the "Processing Task" that can be called by the kernel of FIG. 3, according to the principles of the present invention.
Figure 7B:
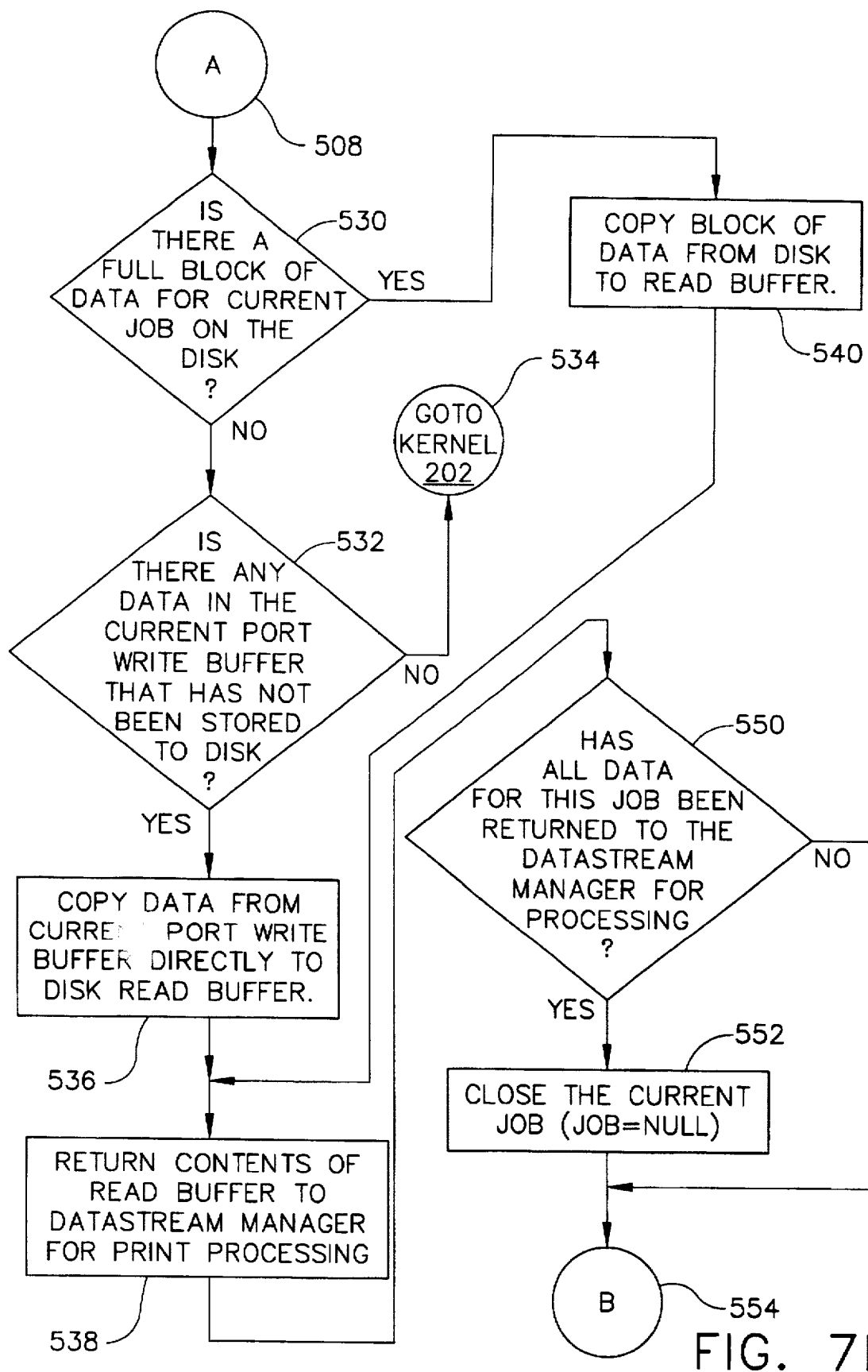

FIGS. 7A and 7B combined are a flow chart depicting the operations of the "Processing Task" 230. This is another of the multitasking functions that is driven by kernel 202, which directs the logic flow through the initial starting point 500. The logic flow arrives at a decision block 502 which determines whether or not the Datastream Manager 146 is "ready" to receive some more data. If the answer is NO, then the logic flow is directed back to the kernel 202 at block 504. If the answer is YES, the logic flow travels to another decision block 506.

Decision block 506 determines if there is a "current" job being worked on. If the answer is YES, then a flag named "Job" is set to the value "NOT Null" (Job≠Null), and the logic flow is directed to the letter "A" at block 508 on FIG. 7A. If the answer is NO, then the flag "Job" is set to Null (Job=Null), and the logic flow is directed to another decision block 510. It will be understood that the current "job" that is being worked on (i.e., being received at a port, and soon to be processed by the interpreters and printed) can be arriving at any of the four ports 71–74 of laser printer 13. This particular job could have already been operated on by the Port #1 Task 204 (see FIG. 5), the Port #2 Task 206 (see FIG. 6), or the Port #n Task 208 (not shown in detail, herein). In other words, this could be "Job (X)" from Port #1, "Job (Y)" from Port #2, or any other job name from Port #n, and no distinction between which port is involved in the current job is made in the flow chart of FIGS. 7A and 7B.

Decision block 510 determines whether or not there currently exists a "fully buffered" job for the "current port." The term "fully buffered job" means that all blocks (or the one block) of data associated with the current job have been written onto the hard disk 128, and are, therefore, available to be read from that hard disk and into the Disk Read Buffer 136 (via print job data pathway 138). If the answer is YES, it will be understood that the "current job" is also a "new job" (since the logic flow previously travelled through the NO exit of decision block 506), and the logic flow is now directed into a function block 512 that causes the "new job" on the current port (whichever this port physically comprises) to become the "current job" for the purposes of this flow chart of FIGS. 7A and 7B. Once function block 512 has been executed, the logic flow is directed to the letter "A" at block 508 on FIG. 7A.

If the answer at decision block 510 is NO, the logic flow travels to another decision block 514 to determine if there is another port that may presently have a fully buffered job. If the answer is NO, then the logic flow is directed to a decision block 520. If the answer is YES, then the logic flow travels to a function block 516, which causes the "next port" to become the "current port" (i.e., it increments to the "next" port number of printer 13). The preferred method of determining this attribute is to sequentially scan through all of the other ports that are currently enabled for Job Buffering in printer 13. For example, if the "current port" as the logic flow approaches decision block 514 is Port #2, and if all ports (i.e., ports #1, #2, #3, and #4) are presently enabled for Job Buffering, then the "next port" would be Port #3. After the logic flow travels through function block 516, the "current port" would be Port #3. Assuming that the answer for decision block 510 remains NO for a short time interval, then the control logic would continually loop through blocks 510, 514, and 516 until it returned to the current port being Port #2. When that occurs, the decision block 514 will finally provide a NO answer, and the logic flow will proceed to decision block 520.

At decision block 520, it is determined whether or not data is presently arriving on the "current port." It will be understood that the present "current port" could be any of the four ports that are enabled for Job Buffering, as determined by the blocks 510, 514, and 516. If data is arriving on the current port, the logic flow is directed to function block 512, which will make the "new job" on this current port the "current job" (as related above), and the logic flow will continue to the letter "A" at block 508. If no data is presently arriving on the current port, then the logic flow travels to a decision block 522.

Decision block 522 determines if there is another port that may presently have incoming data. If the answer is NO, then the logic flow is directed back to the kernel 202 at block 504. If the answer is YES, then the logic flow travels to a function block 524, which causes the "next port" to become the "current port" (i.e., it increments to the "next" port number of printer 13). The preferred method of determining this attribute is to sequentially scan through all of the other ports that are currently enabled for Job Buffering in printer 13 (just like the scheme described above for function block 516). In the example where the "current port" is Port #2, and assuming that the answer for decision block 520 remains NO for a short time interval, then the control logic would continually loop through blocks 520, 522, and 524 until it returned to the current port being Port #2. When that occurs, the decision block 522 will finally provide a NO answer, and the logic flow will proceed back to the kernel 202 at block 504.

The effect of the logic operations depicted on FIG. 7A is that if a "new job" either becomes "fully buffered" for one of the enabled ports (as detected by decision block 510) or begins "arriving" at one of the enabled ports (as detected by decision block 520), then the logic flow will ultimately be directed to function block 512 and letter "A", which further directs the logic flow to FIG. 7B. Furthermore, if a "current job" is still being "worked on" (as detected by decision block 506), the logic flow will also be directed to letter "A". Moreover, as long as there remains an active "current job", printer 13 will lock onto that job until it is fully processed (as will become clear after a reading of the description of the portion of this flow chart that is depicted in FIG. 7B).

It will be understood that none of the operations depicted on the flow chart of FIGS. 7A and 7B will occur unless the Datastream Manager 146 is "ready" for more data (as detected at decision block 502). By use of the illustrated logic scheme, the port tasks (e.g., the Port #1 Task 204) will receive maximum attention from the multitasking system of the present invention so long as the Datastream Manager 146 is "busy". Since, as related above, the Datastream Interpreters 64, Graphics Engine 160, and Print Engine 62, etc. are comparatively "slow" processes, the Datastream Manager is busy a lot of the time, and the present invention makes good use of that busy time.

On FIG. 7B, the flow chart for the Processing Task 230 continues at the letter "A" at block 508. The logic flow travels to a decision block 530 that determines whether or not a "full block" of data presently exists on hard disk 128 for the "current job". If the answer is YES, the logic flow is directed to a function block 540 that copies this "full block" of data from hard disk 128 to the Disk Read Buffer 136. The logic flow then continues to a function block 538. If the answer is NO, the logic flow travels to a decision block 532 which determines whether or not there is any data presently in the "current port" Disk Write Buffer (i.e., one of the individual buffers 117–120) that has not been stored on hard disk 128. If the answer is NO, the logic flow is directed back to kernel 202, at block 534.

If the answer is YES at decision block 532, then the data presently in the "current port" Disk Write Buffer (one of buffers 117–120) is copied directly into the Disk Read Buffer 136 by function block 536. The logic flow now arrives at function block 538, where the contents of the Read Disk Buffer 136 are transferred into the Datastream Manager 146, for print processing. Function block 538 can be reached by two different logic flow paths, (1) from function block 540 and (2) from function block 536. In either case, print job data is residing in the Disk Read Buffer 136 merely awaiting the signal to be transferred into the Datastream Interpreters 64 for processing (via the Datastream Manager).

In situations where the print job data is directly copied from one of the Disk Write Buffers 117–120 into the Disk Read Buffer 136, the printer 13 has recently not been busy, and the present invention takes advantage of the otherwise unused capacity of the interpreters and print engine by immediately transferring data into the Datastream Manager to be processed now, rather than later (e.g., after that same data has been written to the hard disk). It will be understood that it is desirable to initiate the operation of the Datastream Interpreters 64, Graphics Engine 160, Page Queue Manager 58, and Print Engine 62 as soon as possible, particularly since these typically are among the more computation, memory and time intensive functions of the entire laser printer 13, and the procedure for processing and printing a print job will typically involve a large amount of real time. Therefore, to expedite the utilization of these functions, the "current job" print job data will be transferred directly from the appropriate Disk Write Buffer (of buffers 117–120) to the Disk Read Buffer 136 before that same print job data is written onto the hard disk 128.

It is preferred, nevertheless, that the entire print job data for this particular "current job" print job be physically written onto the hard disk 128 (even though that very same print job may have already been completely processed and sent to the Print Engine 62), otherwise the "power restoration" features of the Initialization Task 200 would not be appropriately conditioned for this particular print job. In other words, in a situation where laser printer 13 suddenly loses power while this particular print job is being printed by Print Engine 62, if the print job had not already been written to the hard disk 128 via the execution of the flow chart of FIG. 5 (which corresponds to the Port #1 Task 204), then this particular print job would be lost forever. On the other hand, if the print job had been successfully written to the hard disk 128 before power was interrupted, then upon power restoration, the entire print job would then have the opportunity to be printed, according to the Initialization Task 200.

After the Disk Read Buffer's contents are sent to the Datastream Manager, the logic flow is directed to a decision block 550 that determines if all data for the "current job" has been sent to Datastream Manager 146. If the answer is NO, then the logic flow is directed to the letter "B" on FIG. 7B, at block 554. After that has occurred, the logic flow proceeds on FIG. 7A back to decision block 502 to see if the Datastream Manager is ready for more data.

If the answer at decision block 550 is YES, then the logic flow travels to a function block 552, which closes the "current job" by setting the "Job" flag equal to Null (Job= Null). The logic flow further continues to letter "B" (and back to decision block 502).

It will be understood that so long as more "full blocks" of data for the "current job" continue to exist on the hard disk 128, then the printer 13, using its Job Buffering feature, will continue to send this data, via Disk Read Buffer 136, into the interpreters and print engine, so as to lock onto this particular print job until the entire job has been printed as one non-segmented hard copy output. Since decision block 530 will not see any full block of data on the hard disk until the "current job" has been fully buffered (as determined by decision block 510), the "current port" and "current job" will not be allowed to change until the final portion of data for the "current job" (as determined by decision block 550) has been sent to Datastream Manager 146.

In many situations, it will be preferred that, if more than one port simultaneously has a fully buffered job on disk that is ready for processing, and if both of these fully buffered jobs are the beginning of a particular print job for each of those ports, then kernel 202 should direct its immediate attention to the port other than the particular port that has received the kernel's most recent attention. This is especially desirable if a particular port just recently received a rather long print job and has fully printed that job, but then a second rather long print job immediately follows at that same port. In many conventional printers, the second lengthy print job would be immediately received and printed before a print job from another source that arrived at one of the other ports of printer 13 would be serviced.

It will be understood that many schemes of operation could be devised to perform many or all of the tasks that are performed by the present invention without departing from the principles thereof. The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

We claim:

1. A printing system for use with a host computer and a communications link, said printing system comprising:

(a) a printer having a memory circuit for storage of data, a communications port that receives data from said host computer, a combination datastream interpreter and print engine, a processing circuit that controls the routing of data between said memory circuit, said combination datastream interpreter and print engine, and said communications port, said memory circuit comprising a write buffer, a non-volatile memory device, and a read buffer; and (b) said communications port being configured to receive print job data via said communications link, said processing circuit being configured to transfer said print job data from said communications port into said write buffer, said processing circuit being also configured to transfer said print job data from said read buffer into said combination datastream interpreter and print engine, said processing circuit being further configured to transfer said print job data from said write buffer into one of, depending upon the present status of said combination datastream interpreter and print engine, said non-volatile memory device and said read buffer.

2. The printing system as recited in claim 1, wherein said printer is configured to transfer said print job data from said write buffer into said read buffer via a fast data path when said combination datastream interpreter and print engine are ready to receive more print job data, and when no full block of print job data is available at said non-volatile memory device.

3. The printing system as recited in claim 1, wherein said printer is configured to transfer said print job data from said write buffer into said non-volatile memory device when said combination datastream interpreter and print engine are not ready to receive more print job data.

4. The printing system as recited in claim 1, wherein said printer comprises a laser printer and said non-volatile memory device comprises a hard disk.

5. The printing system as recited in claim 1, further comprising a second communications port that is configured to receive print job data, and a second write buffer within said memory circuit; wherein each of said communications ports and write buffers substantially simultaneously receives print job data and transfers said print job data to said non-volatile memory device regardless as to which of said communications ports has data currently being processed by said combination datastream interpreter and print engine.

6. The printing system as recited in claim 1, further comprising a second communications port that is configured to receive print job data, and a second write buffer within said memory circuit; wherein each of said communications ports and write buffers substantially simultaneously receives print job data that is transferred to said non-volatile memory device, and wherein the print job data that becomes fully buffered first on said non-volatile memory device, of the print job data that is being transferred from said write buffers, is transferred to said read buffer then to said combination datastream interpreter and print engine, via a fast track, regardless as to which of said communications ports initially began receiving said print job data.

7. The printing system as recited in claim 1, wherein said printer is configured to transfer said print job data from said write buffer into said non-volatile memory device for every print job received by said printer, including print jobs in which said print job data was earlier transferred from said write buffer into said read buffer.

8. The printing system as recited in claim 7, wherein said print job data for each individual print job, once stored in said non-volatile memory device, remains in said non-volatile memory device until each said individual print job has been completely printed by said print engine.

9. The printing system as recited in claim 8, wherein said print job data for each individual print job, once stored in said non-volatile memory device, is printed in its entirety by said print engine after power has been restored to said printer.

10. A method of buffering print jobs in a printer system having a memory circuit for storage of data, a communications port that receives data, a combination datastream interpreter and print engine, a processing circuit that controls the routing of data between said memory circuit and communications port, wherein said memory circuit comprises a write buffer, a non-volatile memory device, and a read buffer, said method comprising the steps of:

(a) receiving print job data at said communications port, and transferring said print job data into said write buffer;

(b) transferring, from said write buffer, said print job data into said read buffer via a fast data path when said combination datastream interpreter and print engine are ready to receive more print job data, then transferring said print job data from said read buffer into said combination datastream interpreter and print engine; and (c) transferring, from said write buffer, said print job data into said non-volatile memory device when no full block of print job data is available at said non-volatile memory device and when said combination datastream interpreter and print engine are not ready to receive more print job data.

11. The method as recited in claim 10, further comprising the steps of:

receiving print job data at a second communications port, and transferring said print job data into a second write buffer; and substantially simultaneously transferring said print job data from both of said write buffers to said non-volatile memory device regardless as to which of said communications ports has data currently being processed by said combination datastream interpreter and print engine.

12. The method as recited in claim 10, further comprising the steps of:

receiving print job data at a second communications port, and transferring said print job data into a second write buffer; substantially simultaneously transferring said print job data from both of said write buffers to said non-volatile memory device; and transferring the print job data that becomes fully buffered first on said non-volatile memory device, of the print job data that is being transferred from said write buffers, to said read buffer then to said combination datastream interpreter and print engine, via a fast track, regardless as to which of said communications ports initially began receiving said print job data.

13. The method as recited in claim 10, further comprising the step of:

transferring said print job data from said write buffer into said non-volatile memory device for every print job received by said printer, including print jobs in which said print job data was earlier transferred from said write buffer into said read buffer.

14. The method as recited in claim 13, further comprising the step of:

continuing to store said print job data for each individual print job in said non-volatile memory device until each said individual print job has been completely printed by said print engine.

15. The method as recited in claim 14, further comprising the step of:

printing, after power has been restored to said printer, each individual print job that is stored in said non-volatile memory device.

16. A printing system for use with at least two host computers and a communications link, said printing system comprising:
   (a) a printer having a memory circuit for storage of data, a plurality of communications ports that each receive data from at least one of said host computers, a combination datastream interpreter and print engine, a processing circuit that controls the routing of data between said memory circuit, said combination datastream interpreter and print engine, and said communications ports; said memory circuit comprising a plurality of write buffers, a non-volatile memory device, and a read buffer;
   (b) said plurality of communications ports each being configured to receive print job data via said communications link, said processing circuit being configured to transfer said print job data from said communications ports into a corresponding one of said write buffers, said processing circuit being also configured to transfer said print job data from each of said write buffers into said non-volatile memory device, said non-volatile memory device being configured to store said print job data from each of said write buffers as a separate file and to accumulate all said print job data for each said separate file until those files are each fully buffered in said non-volatile memory device; and
   (c) when said combination datastream interpreter and print engine are available to receive more data, said processing circuit being further configured to transfer said print job data from said non-volatile memory device for the next of said separate files to become fully buffered into said read buffer via a fast track, then to further transfer said print job data into said combination datastream interpreter and print engine.

17. The printing system as recited in claim 16, wherein said printer comprises
   a laser printer and said non-volatile memory device comprises a hard disk.

18. The printing system as recited in claim 16, wherein said processing circuit is multitasking, and said separate files of print job data are accumulated on said non-volatile memory device from more than one of said communications ports and write buffers substantially simultaneously.

19. The printing system as recited in claim 18, wherein each of said separate files of print job data comprise at least one block of data that first accumulates within one of said write buffers, then is transferred to said non-volatile memory device as an entire block.

20. The printing system as recited in claim 19, wherein each of said separate files of print job data become fully buffered in said non-volatile memory device when the final block of said blocks of data are transferred from the corresponding of said write buffers to said non-volatile memory device.

21. A method of buffering print jobs in a printer system having a memory circuit for storage of data, a plurality of communications ports that receive data, a combination datastream interpreter and print engine, a processing circuit that controls the routing of data between said memory circuit, said combination datastream interpreter and print engine, and said communications port, wherein said memory circuit comprises a plurality of write buffers, a non-volatile memory device, and a read buffer, said method comprising the steps of:
   (a) receiving print job data at each of said communications ports, and transferring said print job data into a corresponding one of said write buffers;
   (b) transferring said print job data from each of said write buffers into said non-volatile memory device as a separate file per each of said write buffers, and accumulating all said print job data for each said separate file until those files are each fully buffered in said non-volatile memory device; and
   (c) when said combination datastream interpreter and print engine are available to receive more data, transferring said print job data from said non-volatile memory device for the next of said separate files to become fully buffered into said read buffer via a fast track, then further into said combination datastream interpreter and print engine.

22. The method as recited in claim 21, further comprising the step of: giving priority to smaller print jobs, over larger print jobs, that have been received by said printer system.

23. The method as recited in claim 21, further comprising the step of: giving priority to a print job that has been received by said printer system at a port other than the port that had the most recent print job fully buffered at said non-volatile memory device.

24. The method as recited in claim 23, further comprising the steps of providing said processing circuit as multitasking, and print job data substantially simultaneously is: (1) received at more than one of said communications ports, (2) transferred to more than one of said write buffers, and (3) accumulated in said non-volatile memory device for more than one separate file.

* * * * *